(12) United States Patent
Ike et al.

(10) Patent No.: US 6,863,715 B2
(45) Date of Patent: Mar. 8, 2005

(54) METHOD FOR CLEANING AIR AND APPARATUS THEREFOR, AND METHOD FOR HUMIDIFYING AIR AND APPARATUS THEREFOR

(75) Inventors: Hidetoshi Ike, Yokohama (JP); Yasushi Ishikawa, Yokohama (JP); Shigemi Watanabe, Yokohama (JP); Kazunari Kakuta, Yokohama (JP)

(73) Assignee: Kankyo Co., Ltd., Kanagawa (JP)

( * ) Notice: Subject to any disclaimer, the term of this patent is extended or adjusted under 35 U.S.C. 154(b) by 0 days.

(21) Appl. No.: 10/671,569

(22) Filed: Sep. 29, 2003

(65) Prior Publication Data

US 2004/0055467 A1 Mar. 25, 2004

Related U.S. Application Data

(62) Division of application No. 09/869,349, filed as application No. PCT/JP00/07615 on Oct. 30, 2000, now Pat. No. 6,663,695.

(30) Foreign Application Priority Data

Oct. 28, 1999 (JP) ............................................ 11-306887

(51) Int. Cl.[7] .......................... B01D 47/00; B01D 46/26
(52) U.S. Cl. ............................ 96/233; 55/400; 95/215; 95/277; 95/281; 96/286
(58) Field of Search ......................... 15/215, 277, 278, 15/281; 96/281, 282, 286, 228, 230, 233; 55/400

(56) References Cited

U.S. PATENT DOCUMENTS

| | | | | |
|---|---|---|---|---|
| 1,510,353 A | * | 9/1924 | Turner | 95/151 |
| 1,717,412 A | * | 6/1929 | Rowe | 96/249 |
| 2,941,872 A | * | 6/1960 | Pilo et al. | 422/259 |
| 3,653,187 A | * | 4/1972 | Petersen | 96/281 |
| 3,993,564 A | * | 11/1976 | Novak | 210/360.2 |

(List continued on next page.)

FOREIGN PATENT DOCUMENTS

| | | |
|---|---|---|
| CH | 609-003 A5 | 2/1979 |
| DE | 682-162 | 10/1939 |
| DE | 91 226 | 7/1971 |
| EP | 0 306 278 A1 | 3/1989 |
| GB | 1 559 530 | 1/1980 |
| JP | 39-2095 | * 1/1969 |
| JP | 49-156088 | 12/1974 |
| JP | 57-150457 A | 9/1982 |
| JP | 58-214317 A | 12/1983 |
| JP | 58-214317 | 12/1983 |
| JP | 60-13222 U | 1/1985 |
| JP | 60-21637 U | 2/1985 |
| JP | 60-108330 U | 7/1985 |
| JP | 61-107957 A | 5/1986 |
| JP | 61-84119 U | 6/1986 |
| JP | 61-121929 U | 8/1986 |
| JP | 07-299318 A | 11/1995 |
| JP | 8-206436 A | 8/1996 |
| JP | 2000-42330 A | 2/2000 |
| JP | 2000-074429 A | 3/2000 |

*Primary Examiner*—Duane S. Smith
(74) *Attorney, Agent, or Firm*—Birch, Stewart, Kolasch & Birch, LLP

(57) ABSTRACT

A method for cleaning air and an air cleaner utilizing it are disclosed, by which the air cleaner can be made smaller than the conventional air cleaners when the performances are the same. According to the method of the invention, a filter formed on peripheral portion of a disk is formed along the peripheral portion of the disk so as to surround inside area of the disk is rotated, which filter is bent into wave-shape such that irregularities of the wave are formed in radial direction of the disk, thereby discharging air existing on the inside area of the disk to outside of the disk through the filter.

20 Claims, 15 Drawing Sheets

U.S. PATENT DOCUMENTS

| | | | |
|---|---|---|---|
| 4,130,404 A | * 12/1978 | Bergdahl | 96/230 |
| 4,135,894 A | * 1/1979 | Himes et al. | 95/215 |
| 4,157,249 A | * 6/1979 | Namy | 96/282 |
| 4,212,654 A | * 7/1980 | Caraway et al. | 95/218 |
| 4,292,055 A | * 9/1981 | De Castella et al. | 96/118 |
| 5,055,115 A | 10/1991 | Yikai et al. | |
| 5,573,563 A | * 11/1996 | Odom et al. | 55/301 |
| 5,578,113 A | 11/1996 | Glenn | |
| 5,641,343 A | 6/1997 | Frey | |
| 5,783,067 A | 7/1998 | Belden | |
| 6,071,330 A | 6/2000 | Matsubara et al. | |
| 6,099,609 A | 8/2000 | Lira et al. | |
| 6,398,852 B1 | 6/2002 | Loreth | |
| 6,627,166 B1 | * 9/2003 | Simon | 423/210 |
| 6,663,695 B2 | * 12/2003 | Ike et al. | 96/52 |
| 2002/0178919 A1 | * 12/2002 | Miles | 95/268 |
| 2003/0167922 A1 | * 9/2003 | Ike et al. | 96/66 |
| 2004/0055467 A1 | * 3/2004 | Ike et al. | 96/52 |

* cited by examiner

METHOD FOR CLEANING AIR AND APPARATUS THEREFOR, AND METHOD FOR HUMIDIFYING AIR AND APPARATUS THEREFOR

This application is a divisional of application Ser. No. 09/869,349. now U.S. Pat. No. 6,663,695 filed on Jun. 28, 2001, the entire contents of which are hereby incorporated by reference and for which priority is claimed under 35 U.S.C. § 120. Application Ser. No. 09/869,349 is the national phase of PCT International Application No. PCT/JP00/07615 filed on Oct. 30, 2000 under 35 U.S.C. § 371. The entire contents of each of the above-identified applications are hereby incorporated by reference. This application also claims priority of application Ser. No. 306887/99 filed in Japan on Oct. 28, 1999 under 35 U.S.C. § 119, which is hereby incorporated by reference.

TECHNICAL FIELD

The present invention relates to a method for cleaning air and an apparatus therefor, and to a method for humidifying air and apparatus therefor.

BACKGROUND ART

Various conventional air cleaners utilizing fans and filters are known. The principle of these air cleaners is to make air pass through a filter compulsively using a fan so as to make the dusts in the air be captured by the filter, thereby cleaning the air. In most of the usual air cleaners, the fan and the filter are completely separated and wind made by the fan is blown to the filter. Japanese Laid-open Patent Application (Kokai) No. 8-206436 discloses an air cleaner based on a sirocco fan of which side wall is made of a filter so that air flow is made to pass through the filter from the inside to the outside thereof by rotating the impeller, thereby cleaning the air.

DISCLOSURE OF THE INVENTION

An object of the present invention is to provide a method for clearing air and an air cleaner using the same, by which the air cleaner can be made more compact than the conventional air cleaners when the performances are the same. Another object of the present invention is to provide an air humidifier based on the similar principle to that of the air cleaner of the present invention, by which the air humidifier can be made compact.

The present inventors intensively studied to discover that by bending a filter into wave-shape and by rotating the filter it self, the filter serves as both blades of an impeller and a filter, so that the air cleaner can be made more compact than the conventional air cleaners when the performances are the same.

That is, the present invention provides a method for cleaning air comprising rotating a filter formed on peripheral portion of a disk such that the filter is formed along the peripheral portion of the disk so as to surround inside area of the disk, which filter is bent into wave-shape such that irregularities of the wave are formed in radial direction of the disk, thereby discharging air existing on the inside area of the disk to outside of the disk through the filter. The present invention also provides an air cleaner comprising a disk; a filter formed on peripheral portion of the disk such that the filter is formed along the peripheral portion of the disk so as to surround inside area of the disk, which filter is bent into wave-shape such that irregularities of the wave are formed in radial direction of the disk. The present invention further provides a method for humidifying air comprising rotating a filter formed on peripheral portion of a disk such that the filter is formed along the peripheral portion of the disk so as to surround inside area of the disk, which filter is bent into wave-shape such that irregularities of the wave are formed in radial direction of the disk, the filter retaining water therein, thereby discharging air existing on the inside area of the disk to outside of the disk through the filter so as to give the water retained in the filter to the air. The present invention still further provides an air humidifier comprising a disk; a filter formed on peripheral portion of the disk such that the filter is formed along the peripheral portion of the disk so as to surround inside area of the disk, which filter is bent into wave-shape such that irregularities of the wave are formed in radial direction of the disk, which filter retains water; and means for rotating the disk.

According to the present invention, an air cleaner having larger surface area of the filter per volume of the product (i.e., compact and having high efficiency of collecting dusts) than the conventional air cleaners in which the fans and the filters are completely separated, and than the air cleaner disclosed in Japanese Laid-open Patent Application (Kokai) No. 8-206436 in which an impeller is enclosed in a filter, can be attained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

BEST MODE FOR CARRYING OUT THE INVENTION

Figure 1:
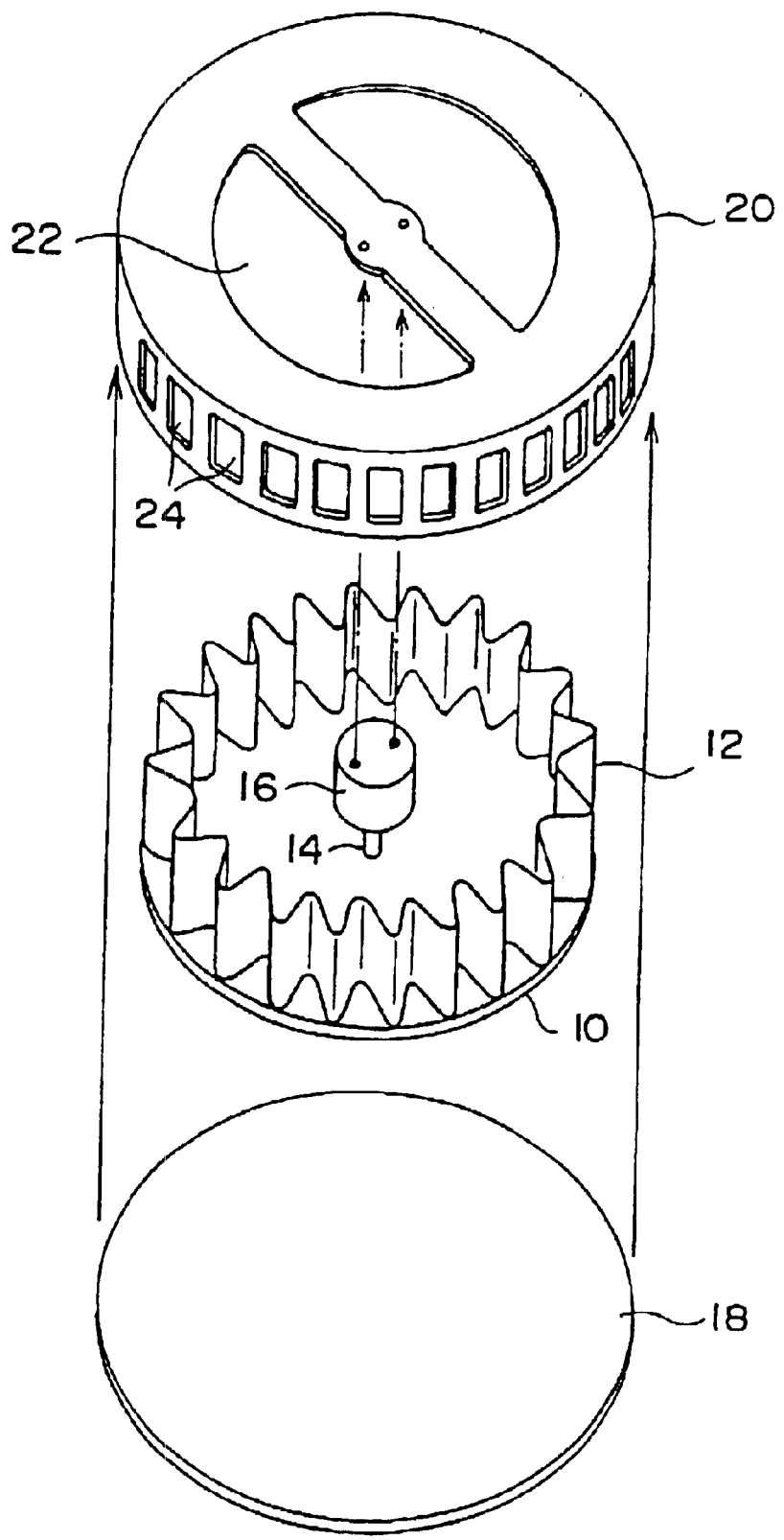
FIG. 1 is an exploded perspective view of a preferred embodiment of the air cleaner according to the present invention

A preferred embodiment of the present invention will now be described referring to FIGS. 1 and 2. FIG. 1 is an exploded perspective view of a preferred embodiment of the air cleaner or the air humidifier according to the present invention FIG. 2 shows the air cleaner or air humidifier obtained by assembling the members shown in FIG. 1.

Figure 2:
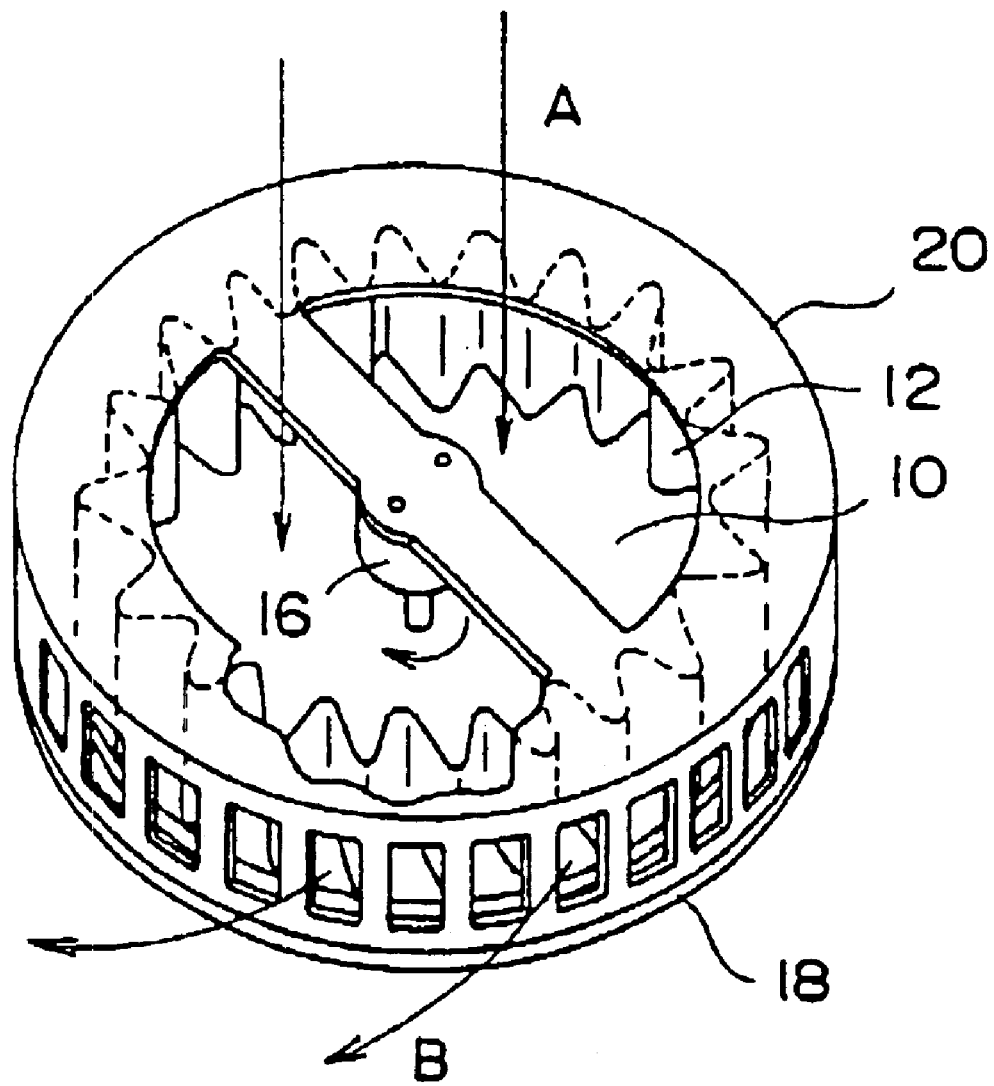
FIG. 2 shows the air cleaner obtained by assembling the members shown in FIG. 1.

The air cleaner shown in FIGS. 1 and 2 comprises a disk 10 and a filter 12 formed on and along the peripheral portion of the disk 10. As shown, the filter 12 surrounds an inside area of the disk 10, and the filter 12 is bent into a wave-shape such that irregularities of the wave are formed in a radial direction of the disk 10. It should be noted that although the irregularities of the filter are depicted in FIGS. 1 and 2 in exact radiate form in the radial direction from a rotation shaft 14 as the center thereof, each outer tip (the outer U-turning portion of the irregularities) is not necessarily in the center between the adjacent two inner tips (on the radiate lines), but may be shifted in clockwise direction or anti-clockwise direction. That is, although the shape of the irregularities is depicted in FIGS. 1 and 2 in exact radiate form in the radial direction from the rotation shaft 14 as the center, the irregularities may be in the shape like a parabola or vane directing outward from the rotation shaft 14 as the center. The filter 12 is fixed on the disk 10, so that by rotating the disk 10, the filter 12 is also rotated together with the disk 10. On the center of the disk 10, the rotation shaft 14 is fixed, and the rotation shaft 14 is connected to a motor 16.

The above-described members are preferably contained in a casing. A casing having a cylindrical shape or having a shape of a snail wherein only one air inlet is formed (see FIGS. 3 and 4) may preferably be employed. The casing shown in FIG. 1 comprises a lower casing 18 in the form of a disk and an upper casing in the form of cylinder having a cover. The upper face of the upper casing 20 has air inlets 22 for inhaling air into the area surrounded by the filter 12. The side face of the upper casing 20 has air outlets 24 for discharging the air to the outside of the filter 12, which air comes through the filter 12. It should be noted that the shapes and numbers of the air inlets 22 and of the air outlets 24 are not restricted to those shown in the figures. In the embodiment shown in FIG. 1, since the upper casing 20 is fixed to the motor 16 itself, the upper casing 20 does not rotate, and since the lower casing 18 is fixed to the upper casing 20, the lower casing 18 also does not rotate.

As the filter 12, any filters conventionally employed in air cleaners may be employed. Thus, the filter may be made of a relatively dense porous material by which the dusts and the like having diameters larger than the diameters of the pores are removed, or may be made of a porous material having a relatively large pore size and having adsorption ability, by which the dusts and the like having smaller sizes than the pores are also adsorbed to the filter. The filter may be provided with adsorption ability by retaining active carbon or the like. The material of the filter is also not restricted at all and any optional porous materials made of paper, cloth, non-woven fabric, cotton, metal mesh, sponge, ceramics or the like may be employed.

In operation, the motor 16 is rotated so as to rotate the disk 10 and the filter 12. The rotational speed is not restricted and may appropriately be selected depending on the shape of the filter and the size of the apparatus. Usually, the rotational speed may be about 200 to 3000 rpm, preferably about 400 to 1000 rpm. Upon rotation of the filter 12, since the filter 12 is bent into the wave-shape as shown in the figures, the filter 12 serves as the blades of an impeller so that wind is generated. As a result, the air existing on the inside area of the disk 10, surrounded by the filter 12 is blown to the outside of the disk 10 from the air outlets 24 formed on in the side face of the upper casing 20 after passing through the filter 12, as indicated by arrows B shown in FIG. 2. Simultaneously, as shown by arrows A in FIG. 2, air is inhaled from the air inlets 22 formed on the upper face of the upper casing 20. Although air can pass through the filter 12, since the rotational speed of the filter 12 is large, the filter 12 can serve as blades of an impeller because of the air resistance of the filter 12. Thus, the air existing on the inside area of the disk 10, which area is surrounded by the filter 12, is discharged to the outside after passing through the filter 12, wherein the air discharged to the outside is cleaned by passing through the filter 12.

In the above description, the case where the air cleaner is used in the position in which the disk is held horizontally, was described. However, the above-described air cleaner can be used while holding the disk in the vertical direction, that is, in the portrait orientation. Needless to say, the air cleaner may also be used retaining the air cleaner at an optional angle other than horizontal and vertical directions. This is also true in the more preferred embodiments described below. In cases where the air cleaner is used in the portrait orientation in which the disk is held vertically, although the terms such as "upper" casing and "lower casing" are not applicable, in the present specification, based on the orientation where the disk is held horizontally and the disk is located underside of the air cleaner, the terms "upper", "lower", "up", "low", "upper face", "lower face" and the like may be used.

According to the present invention, an air cleaner having larger surface area of the filter per volume of the product (i.e., compact and having high efficiency of collecting dusts) than the conventional air cleaners in which the fans and the filters are completely separated (hereinafter referred to as "Prior Art 1" for convenience), and than the air cleaner disclosed in Japanese Laid-open Patent Application (Kokai) No. 8-206436 in which an impeller is enclosed in a filter (hereinafter referred to as "Prior Art 2" for convenience), can be attained.

For example, when the fan has an impeller having an outer diameter of 110 mm, a thickness of 19 mm, a width of blade of 15 mm and the number of blades of 25, and has a diameter of the air inlet of 84 mm, the areas of the filter in Prior Art 1, Prior Art 2 and the present invention will now be compared. According to Prior Art 1, to make the apparatus most compact, the filter is arranged at the air inlet, so that the effective filter area is 5542 $mm^2$ On the other hand, according to Prior Art 2, it is 6566 mm. On the other hand, according to the present invention, when the wave number of the filter is the same as the number of blades of the Prior Art 1 and 2, the effective filter area is 16,150 mm which is 2.9 times that of Prior Art 1, and 2.5 times that of Prior Art 2. Thus, when the performances are the same, an air cleaner which can be made more compact than the conventional air cleaners can be obtained. Therefore, the present invention is especially useful for the development of, for example, portable air cleaners.

Preferred embodiments of the air cleaner according to the present invention described above will be further described.

With the air cleaner according to the present invention described above, a gap is formed between the edge of the filter, which edge is opposite to the disk, and the casing, and air flows through the gap. That is, a part of the air inhaled from the air inlets 22 is discharged to the outside of the air cleaner without passing through the filter, so that the efficiency is decreased accordingly. In preferred embodiments of the present invention, means for reducing air flow passing through the gap (hereinafter referred to as "air flow-reducing means" in the present specification) are provided. The term "reduce" herein means that the amount of the air passing through the above-mentioned gap is decreased by providing the means when compared with the case where the means are not provided. By providing the air flow-reducing means, the air-cleaning efficiency is further promoted.

A first embodiment of the air cleaner provided with such an air flow-reducing means will now be described referring to FIGS. 3 to 5. Although FIGS. 3 and 4 depicts the state wherein the disk 10 is held vertically, as mentioned earlier, even in such a case, the casing covering the side of the disk is called lower casing, and the casing covering the side apart from the disk is called upper casing for convenience.

In this embodiment, the motor 16 is fixed to the lower casing 18. In the lower casing 18, a snail-like partition wall 26 is formed. A part of the partition wall 26 is opened to form an air outlet 24. Thus, in this embodiment, the air outlets are gathered together to form a single air outlet 24. The disk 10 and the filter 12 are contained inside of the partition wall 26. In this embodiment, unlike the above-described embodiment, the motor 16 is arranged on the lower casing 18. That is, the center portion of the disk 10 is protruded and the motor 16 is harbored in the space formed under the protrusion (see FIG. 5).

Figure 3:
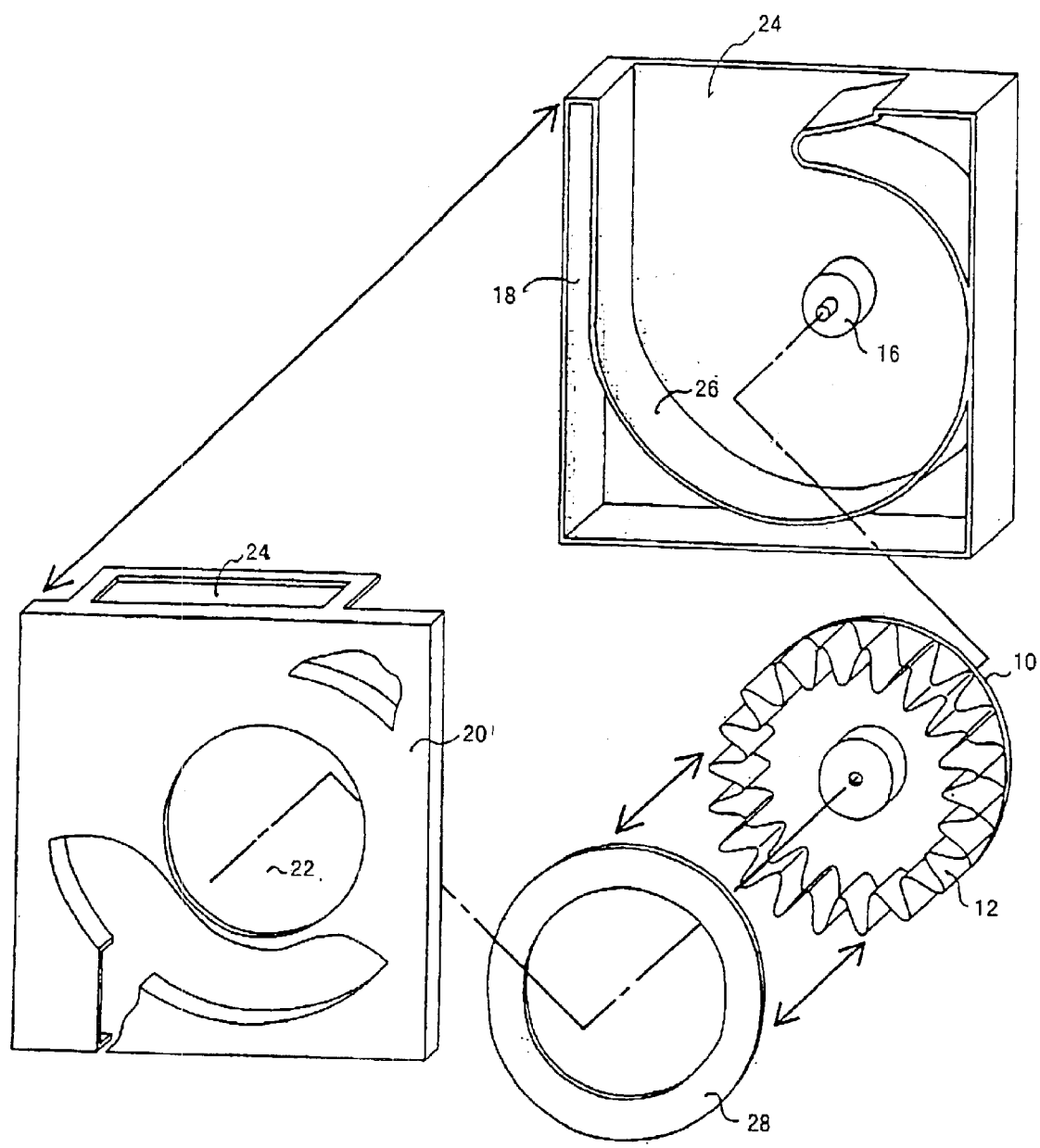
FIG. 3 is a partially cut away exploded view of an embodiment according to the present invention, in which a sealing plate is arranged in the gap between the upper end of the filter and the upper casing so as to reduce air flow passing through the gap.
Figure 4:
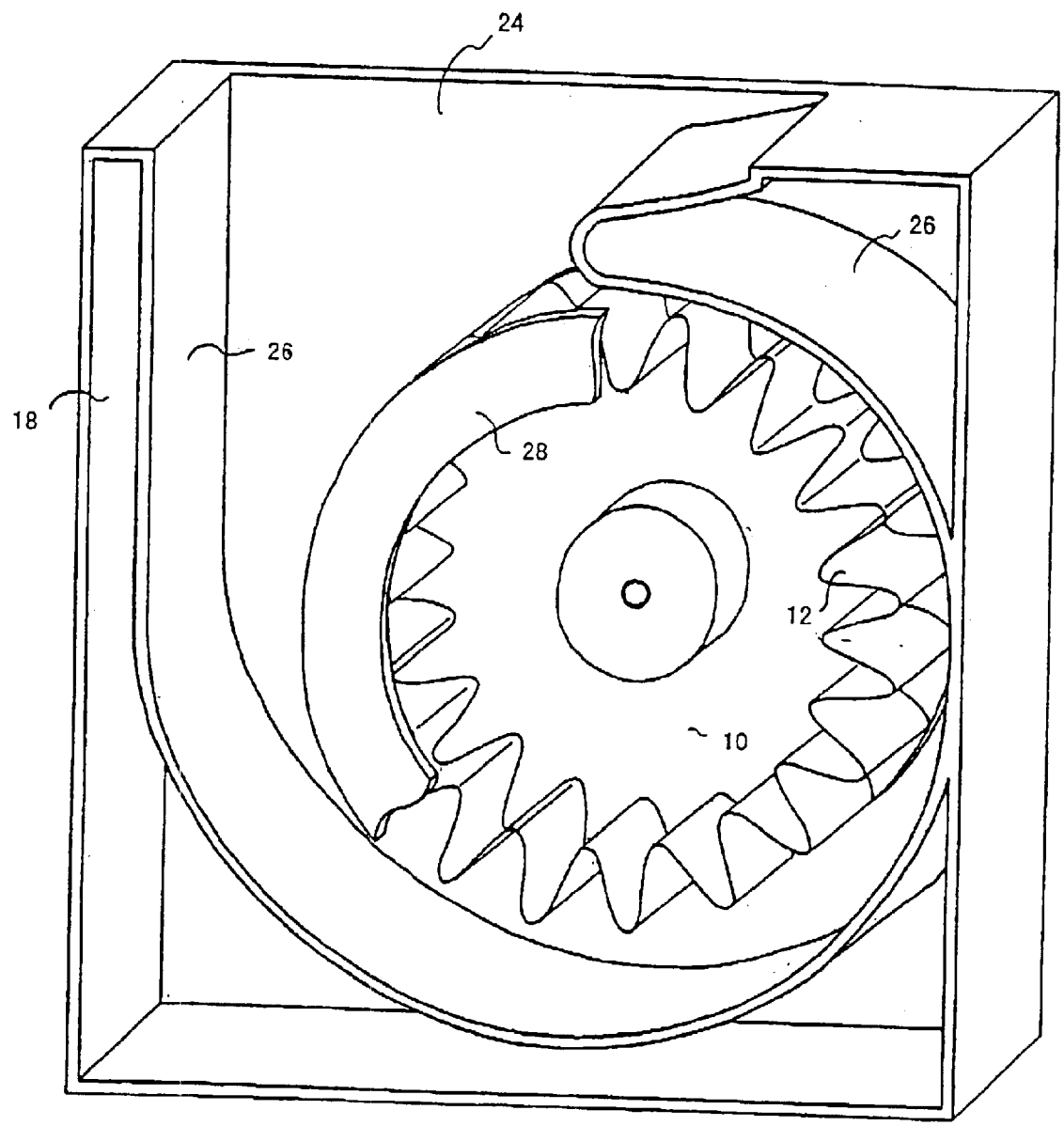
FIG. 4 shows the air cleaner obtained by assembling the members shown in FIG. 3 (provided that the upper casing is removed).

FIG. 3 is an exploded view. When the depicted members are assembled, the members are arranged such that the positions penetrated by the alternate long and short dash line are aligned on a single straight line. FIG. 4 shows the assembled state (provided that the upper casing 20 is removed for clarity). Among the openings depicted in the upper casing 20 in FIG. 3, reference numeral 22 denotes an air inlet. Other openings are those depicted to show partially cut away portions for the purpose of easier comprehension of the shape of the upper casing 20, so that they do not exist actually.

In this embodiment, an annular sealing plate covering the entire edge of the filter 12, which edge is opposite to the disk 10 is provided. The sealing plate 28 rotates together with the filter 12. Therefore, the sealing plate 28 may be fixed to the edge by an adhesive or the like. Alternatively, the sealing plate 28 and the filter 12 or the disk 10 may be connected by mechanical means such as hooks not shown. In FIG. 4, to better show the inner structure, the sealing plate 28 is shown in a partially cut away state.

Figure 5:
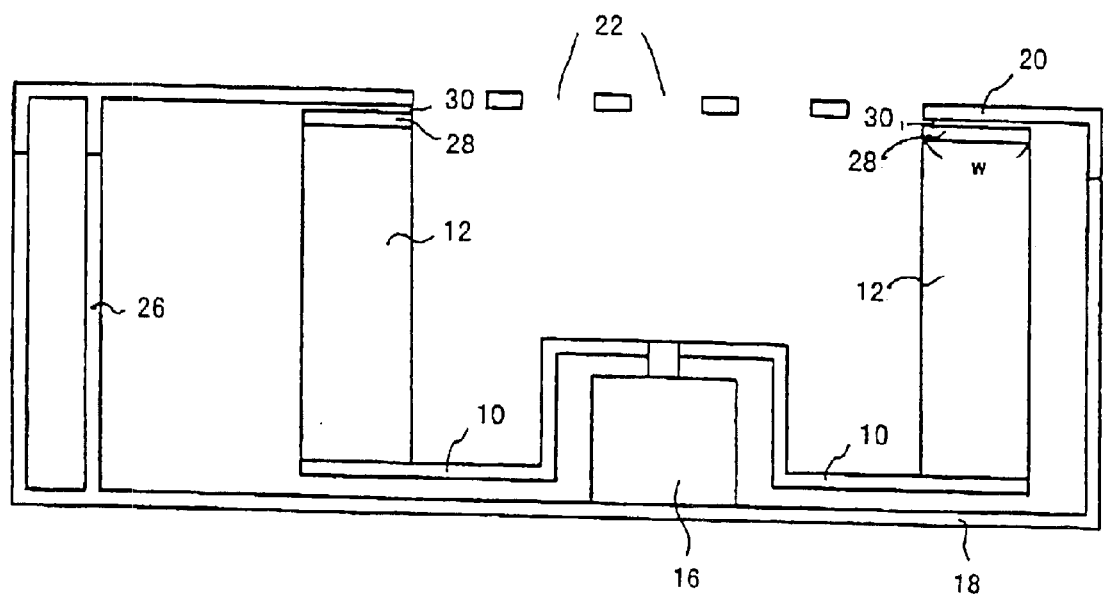
FIG. 5 is a schematic cross-sectional view of the air cleaner shown in FIGS. 3 and 4.

FIG. 5 is a schematic sectional view of the air cleaner shown in FIGS. 3 and 4. It should be noted that FIG. 5 shows the state wherein the disk 10 is held horizontally (landscape orientation). As shown in FIG. 5, although the width W of the sealing plate 28 may preferably be about the same as the width of the entire wavy structure of the filter 12, the width of the sealing plate 28 is not restricted thereto. By providing the sealing plate 28, a part of the gap 30 between the upper edge of the filter 12 and the upper casing 20 is closed so that the gap 30 is made smaller. As a result, the air flow passing through the gap 30 is reduced. In addition, by providing the sealing plate 28, the gap 30 is made to elongate in the horizontal direction in FIG. 5. That is, considering a single point on the upper edge of the filter 12, the distance of the gap 30 in the horizontal direction (the horizontal direction in FIG. 5) is nothing more than the thickness of the filter 12. Since the thickness of the filter 12 is small, the distance of the narrow gap is small accordingly, so that the air resistance is small and air flow is large. In contrast, when the sealing plate 28 is provided, the distance of the gap 30 in the horizontal direction is the width W of the sealing plate 28, shown in FIG. 5. Therefore, to pass through this gap, the air must pass through the narrow gap spanning the entire width W, so that the air resistance is large. Thus, the air flow is largely decreased when compared with the case where the sealing plate 28 is not provided.

Figure 6:
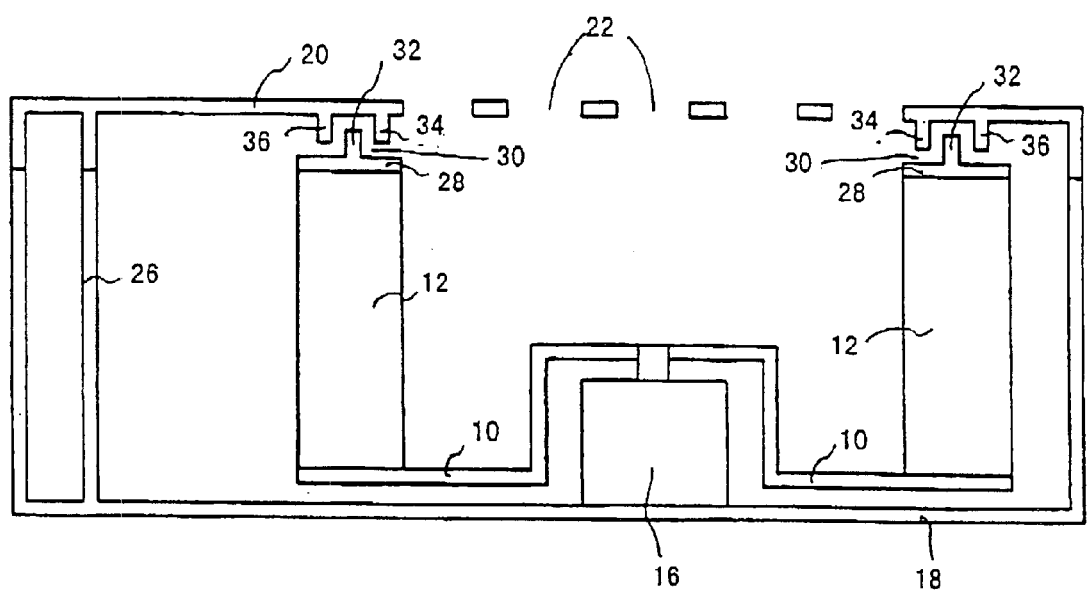
FIG. 6 is a schematic cross-sectional view showing a preferred embodiment of the air cleaner according to the present invention, in which the air flow passing through the gap between the upper end of the filter and the upper casing is reduced.

FIG. 6 shows an embodiment which further improved the embodiment shown in FIGS. 3–5. In the embodiment shown in FIG. 6, a first annular ridge 32 protruding opposite to the filter 12 is formed on the sealing plate 28, and a second annular ridge 34 protruding to the sealing plate 28 is formed on the region of the upper casing 20, which region faces the sealing plate 28. Further, a third annular ridge 36 protruding to the sealing plate 28 is formed on the region of the upper casing 20, which region faces the sealing plate 28. The first ridge 32 is inserted into the space formed between the adjacent second ridge 34 and the third ridge 36. By forming these ridges, the amount of the air flowing through the gap 30 can be further decreased. The number of the ridge(s) formed on the sealing plate 28 or on the region of the upper casing 20, which faces the sealing plate 28, is not restricted to that shown in FIG. 6, and may be one or more, preferably about 1 to 6 ridges/10 mm length of W.

Figure 7:
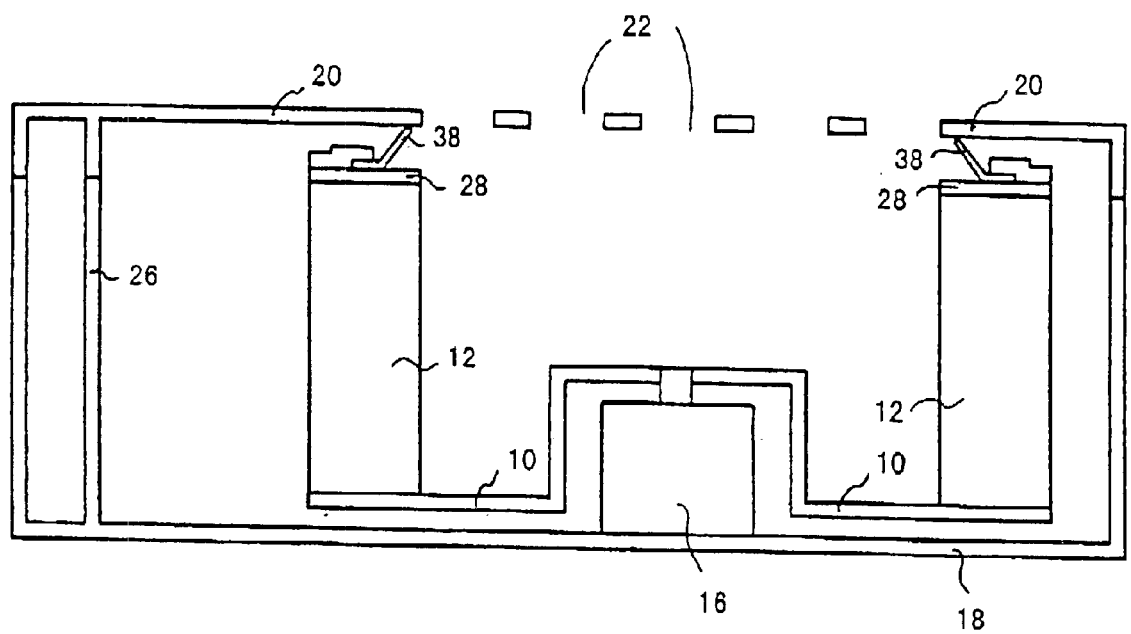
FIG. 7 is a schematic cross-sectional view showing another preferred embodiment of the air cleaner according to the present invention, in which the air flow passing through the gap between the upper end of the filter and the upper casing is reduced.

In another embodiment shown in FIG. 7, the air flow-reducing means is in the form of an annular elastic member 38. The upper end of the elastic member 38 contacts the lower face of the upper casing 20, so that the gap 30 is completely closed. The elastic member 38 closing the gap 30 may also be formed directly on the end of the filter 12 or on the upper casing.

In another preferred mode of the present invention, the filter 12 is electrically conductive, and the air cleaner further comprises means for giving electric potential to the filter 12. The electrically conductive filter 12 may be obtained by, for example, constituting the filter 12 partly or entirely with particles or fibers of active carbon, carbon, copper, stainless steel, tin, nickel, zinc, titanium or the like; or applying a well-known conductive coating containing a metal such as tin, nickel or zinc to the surface of the filter 12; or by immersing the filter 12 in the electroconductive coating. By giving a high electric potential to the filter 12, the dusts in the air can be electrostatically adsorbed, so that the air-cleaning efficiency is further promoted. The electric potential given to the filter may preferably be about 5 kV to 20 kV when the electric potential of the other parts of the apparatus is 0 V (i.e., the state of being grounded). The high electric potential may be given with a high voltage generator. The electric potential to be given may be positive or negative.

Figure 8:
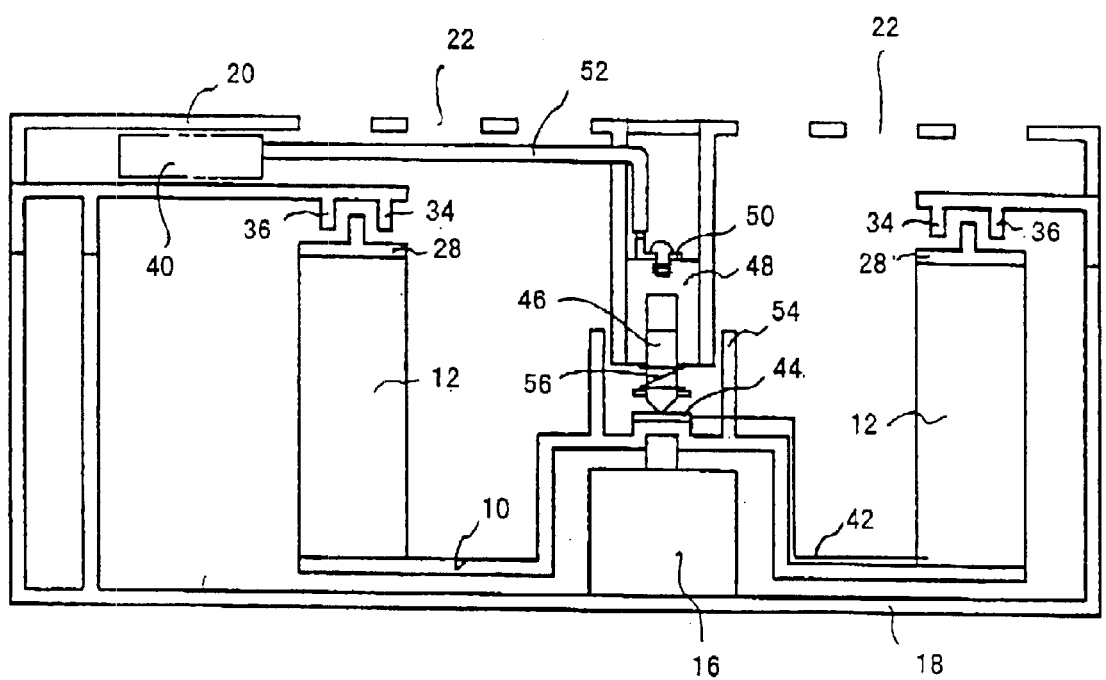
FIG. 8 is a schematic cross-sectional view of a preferred embodiment of the air cleaner according to the present invention, in which a high electric potential is given to the filter.

An embodiment in which a high electric potential is given to the filter 12 will now be described based on FIG. 8. The apparatus shown in FIG. 8 is similar to the apparatus shown in FIG. 6, but the upper casing 20 has a two-stage structure as shown in FIG. 8, and a high voltage generator 40 is harbored in the upper casing 20. The filter 12 is connected to the high voltage generator 40 through a high voltage line 42, a high voltage pin supporting plate 44, a high voltage pin 46, a high voltage pin holder 48, a terminal 50 and a high voltage line 52, and is insulated to the parts other than these parts. A cylindrical wall 54 stands up from the disk 10 so as to surround the high voltage pin 46, thereby preventing dust from being attached to the high voltage region. A part of the high voltage pin 46 is harbored in the high voltage pin holder 48. The high voltage pin 46 is slidable and is urged to the high voltage pin supporting plate 44 by a spring 56. The tip of the high voltage pin 46 is pointed (round tip is also acceptable), and contacts the high voltage pin supporting plate 44 above the rotation shaft of the motor. Thus, when a positive high voltage is generated by the high voltage generator 40, the filter 12 is an anode, and when a negative high voltage is generated by the high voltage generator 40, the filter 12 is a cathode.

In the embodiment shown in FIG. 8, the high voltage pin 46 directly contacts the high voltage pin supporting plate 44. However, the high voltage pin 46 may contact the high voltage pin supporting plate 44 via a conductive bearing.

Figure 9:
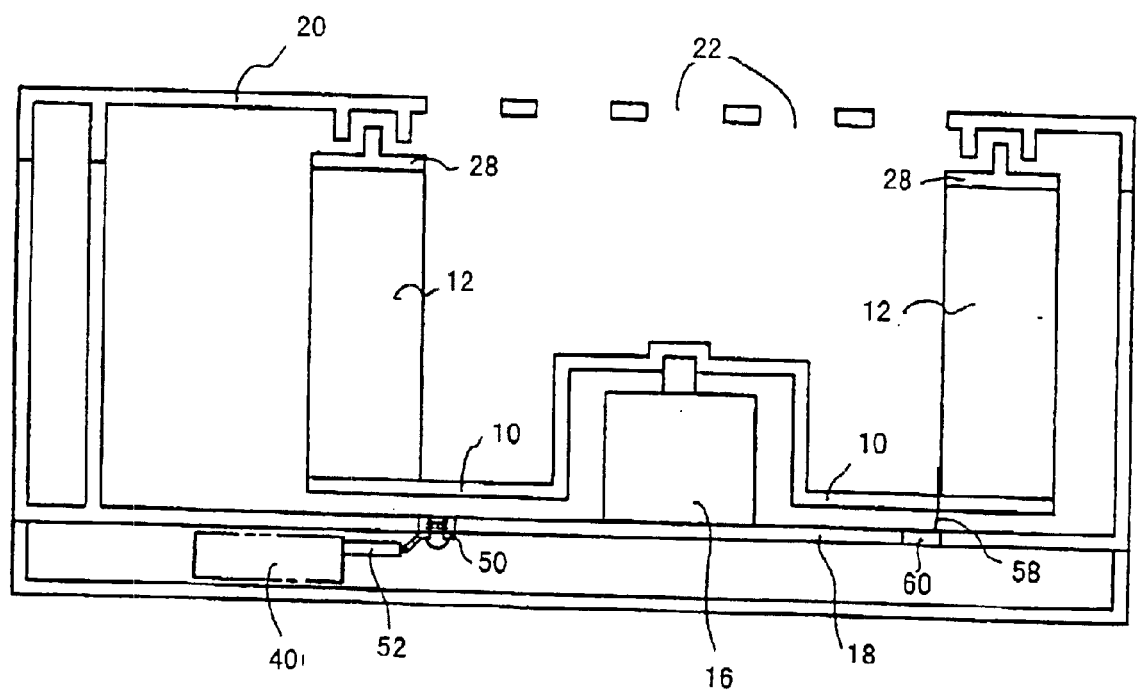
FIG. 9 is a schematic cross-sectional view of another preferred embodiment of the air cleaner according to the present invention, in which a high electric potential is given to the filter.

The embodiment shown in FIG. 9 is also basically similar to the embodiment shown in FIG. 6, but the lower casing 18 has a two-stage structure and the high voltage generator 40 is harbored in the lower casing 18. The filter 12 is connected to the high voltage generator 40 through a high voltage spring 58, a high voltage ring 60, a terminal 50 and a high voltage line 52, and is insulated to the parts other than these parts. The high voltage spring 58 penetrates the disk 10 and is fixed thereto. One end of the high voltage spring 58 contacts the filter 12 and the other end of the high voltage spring 58 slips on the high voltage ring 60 with the rotation of the disk 10. The high voltage ring 60 is annular, of which center is coincident with the rotation axis of the motor, and is made of a conductor such as a metal. Thus, when a positive high voltage is generated by the high voltage generator 40, the filter 12 is an anode, and when a negative high voltage is generated by the high voltage generator 40, the filter 12 is a cathode. Although the high voltage spring 58 shown in FIG. 9 is in the form of one line, it may be in the form of a brush.

In another preferred embodiment of the present invention, the air cleaner further comprises an electrode, the filter is electrically conductive, and the air cleaner further comprises means for applying voltage across the electrode and the filter. In this case, for example, the filter may be grounded and a high voltage may be applied to the electrode. An appropriate voltage between the electrode and the filter may be about 5 kV to 20 kV, although the voltage is not restricted to this range. Although the position at which the electrode is arranged is not restricted, it is preferred to arrange the electrode in the inside area of the filter when the apparatus is viewed from the top. By applying a high voltage between the filter and the electrode, corona discharge occurs between the filter and the electrode, so that the effectiveness to collect the dusts is increased.

Various embodiments wherein the filter is grounded will now be described based on FIGS. 10 to 14.

Figure 10:
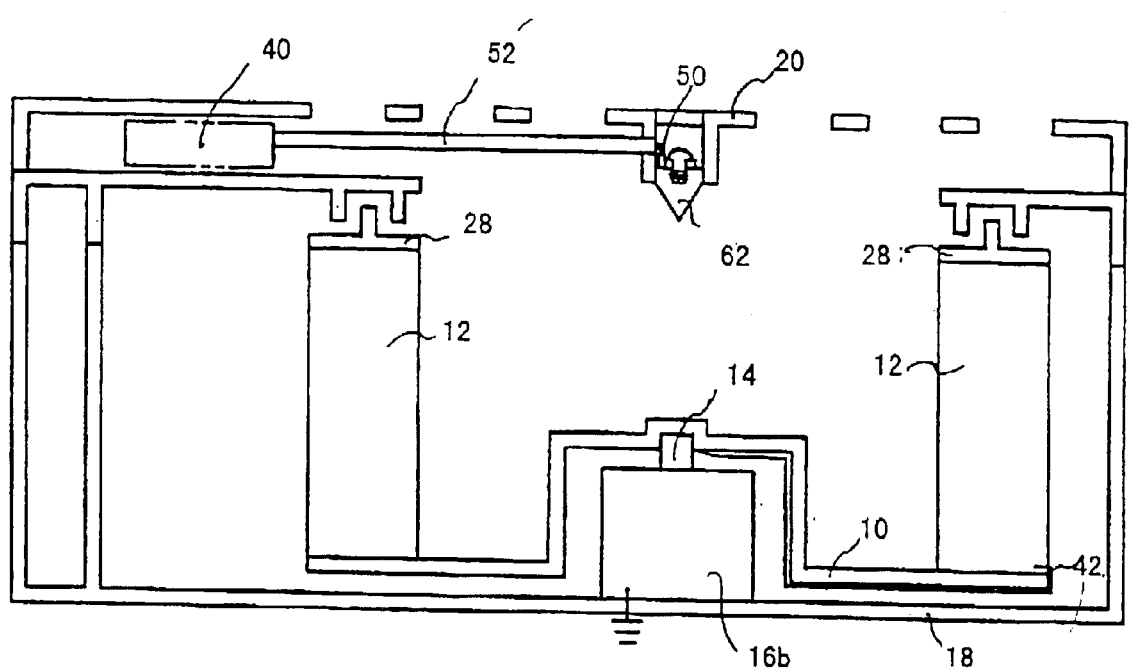
FIG. 10 is a schematic cross-sectional view of a preferred embodiment of the air cleaner according to the present invention, in which the filter is grounded and a high electric potential is given to the electrode.

In the embodiment shown in FIG. 10, the filter 12 is grounded through a high voltage line 42, the rotation shaft 14 of the motor and a motor casing 16b, and is insulated to the parts other than these parts. Thus, the electric potential of the filter 12 is 0 V. The tip of a high voltage electrode 62 is pointed and positioned above the rotation shaft 14 of the motor. The high voltage electrode 62 is connected to a high voltage generator 40 through a terminal 50 and a high voltage line 52, and is insulated to the parts other than these parts. Thus, when a positive high voltage is generated by the high voltage generator 40, the filter 12 is an anode, and when a negative high voltage is generated by the high voltage generator 40, the filter 12 is a cathode.

Figure 11:
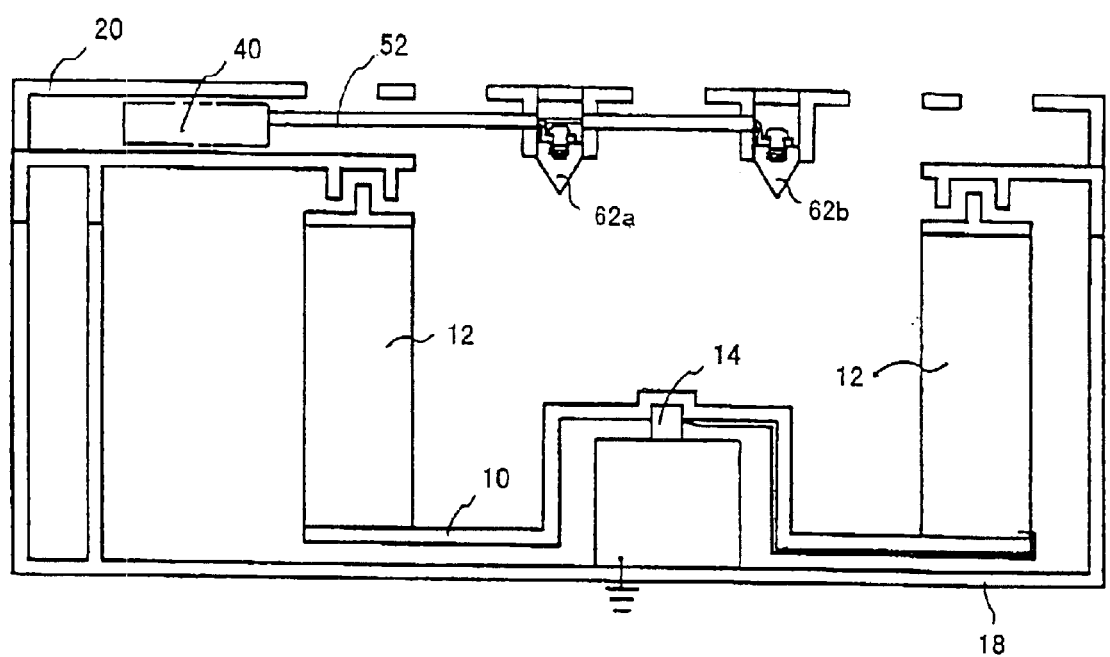
FIG. 11 is a schematic cross-sectional view of another preferred embodiment of the air cleaner according to the present invention, in which the filter is grounded and a high electric potential is given to the electrodes.

The embodiment shown in FIG. 11 is similar to that shown in FIG. 10, but two high voltage electrodes 62a and 62b are formed. In this embodiment, the high voltage electrodes 62a and 62b are arranged at positions symmetrical to each other with respect to the rotation shaft 14 of the motor. The number of the high voltage electrodes may be 3 or more.

Figure 12:
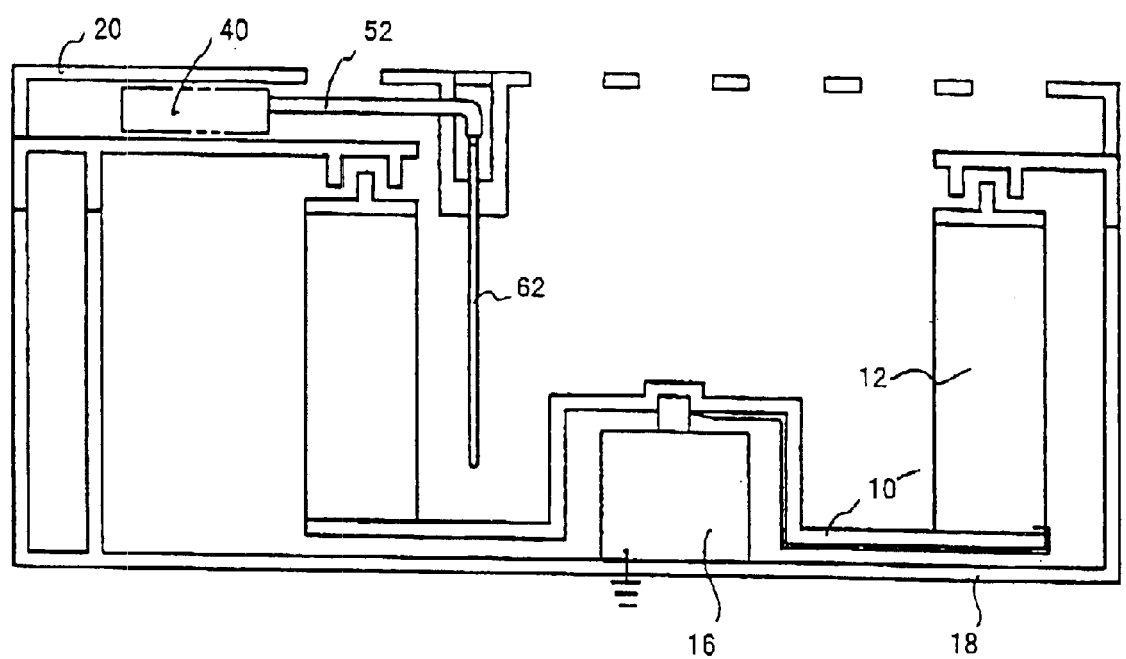
FIG. 12 is a schematic cross-sectional view of still another preferred embodiment of the air cleaner according to the present invention, in which the filter is grounded and a high electric potential is given to the electrode.

The embodiment shown in FIG. 12 is also almost the same as that shown in FIG. 10, but the shape of the high voltage electrode 62 is vertically elongated shape hung from the upper side.

Figure 13:
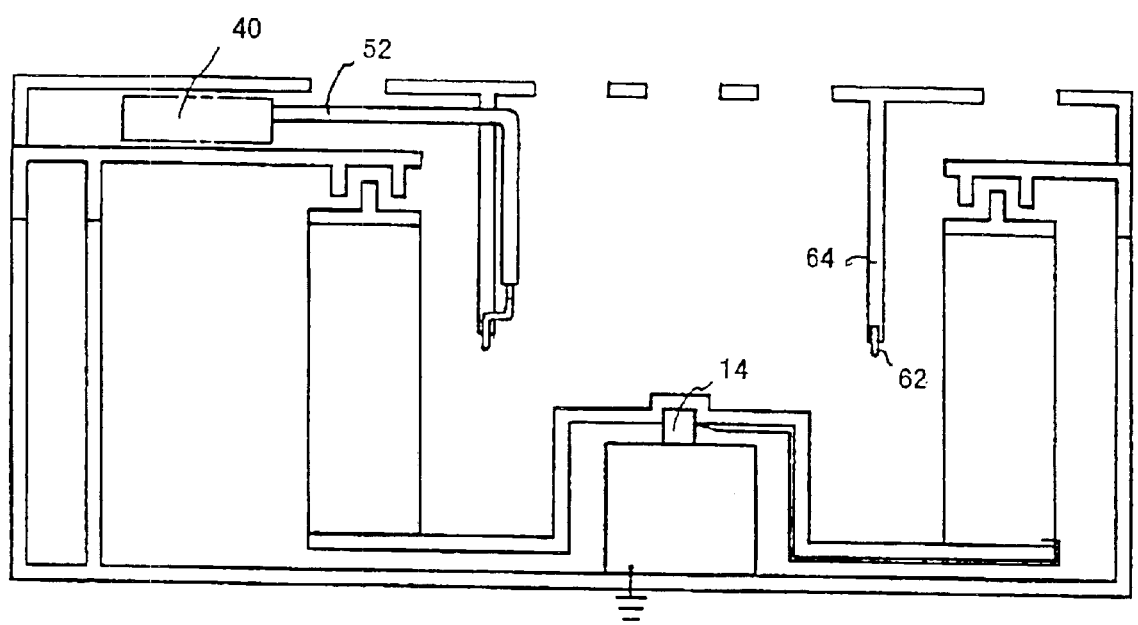
FIG. 13 is a schematic cross-sectional view of still another preferred embodiment of the air cleaner according to the present invention, in which the filter is grounded and a high electric potential is given to the electrode.

In the embodiment shown in FIG. 13, a cylindrical wall 64 of which center is coincident with the rotation shaft 14 of the motor is formed on the upper casing 20. An annular high voltage electrode 62 is embedded in the tip of the wall 64 and slightly protruded from the tip of the wall 64. The thin annular high voltage electrode 62 has a center which is coincident with the center line of the rotation shaft 14 of the motor, and positioned at about the half of the thickness of the filter 12 in the direction of the rotation axis of the filter 12. The high voltage electrode 62 is connected to a high voltage generator 40 through a high voltage line 52.

Figure 14:
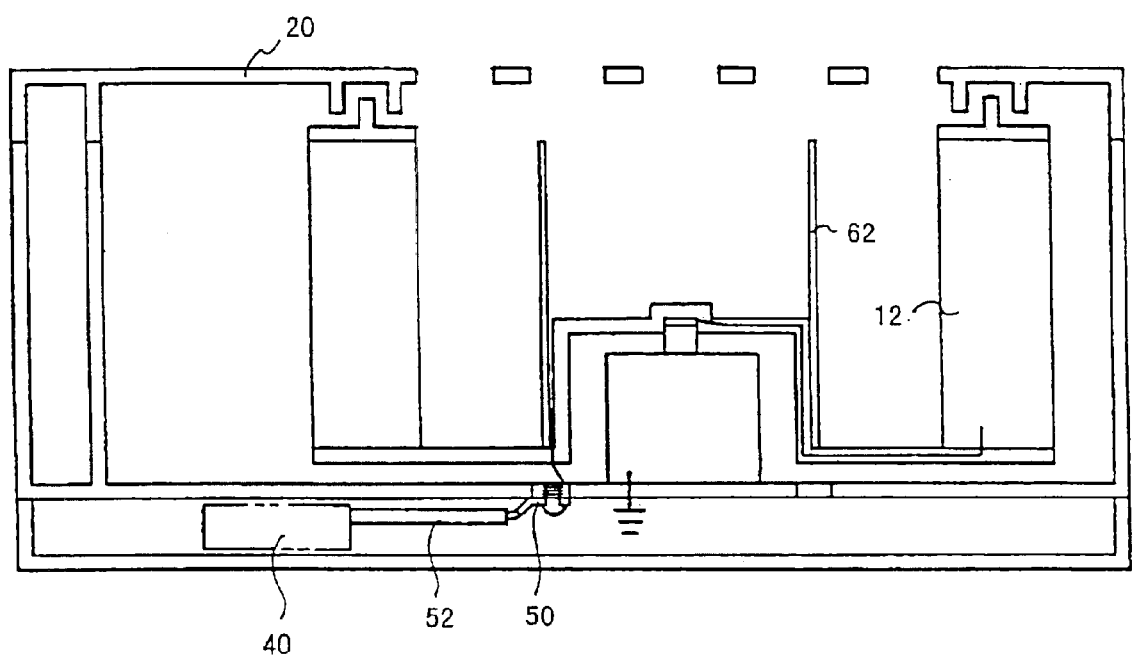
FIG. 14 is a schematic cross-sectional view of still another preferred embodiment of the air cleaner according to the present invention, in which the filter is grounded and a high electric potential is given to the electrode.

In the embodiment shown in FIG. 14, a cylindrical high voltage electrode 62 of which center is coincident with the center line of the rotation shaft 14 of the motor is formed on the disk 10. Although the surface of the cylindrical high voltage electrode 62 in the embodiment shown in FIG. 14 is smooth, the high voltage electrode 62 may have a number of projections. The high voltage electrode 62 is connected to a high voltage generator 40 in the same manner as in the embodiment shown in FIG. 9. The cylindrical high voltage electrode 62 may not be formed on the disk 10, but may be arranged in the upper casing 20 which has a two-stage structure as in the embodiment shown in FIG. 13.

In the embodiments shown in FIGS. 10 to 14, the filter is grounded through the rotation shaft 14 of the motor and the motor casing 16b. Since some bearings are not electrically conductive, however, the filter may not be grounded in this manner. In such a case, it is necessary to use a member such as the high voltage pin 46 shown in FIG. 8. In FIG. 8, although the tip of the high voltage pin 46 does not contact the rotation shaft 14 of the motor, if the high voltage pin supporting plate 44 and the insulator are removed, the high voltage pin 46 contacts the rotation shaft 14 of the motor. Thus, the filter may be grounded through a member like the high voltage pin 46.

Further, without using the end face of the rotation shaft 14 of the motor, the filter may be grounded through a metal brush arranged in the motor 16, which connects the rotation shaft and the motor casing 16b.

In the embodiments shown in FIGS. 10 to 14, the filter 12 is grounded. However, in the structure such as shown in FIG. 8 or 9, the high voltage electrode(s) 62 is(are) arranged as in the embodiments shown in FIGS. 10 to 14, and a high electric potential having a polarity opposite to that of the high voltage electrode(s) 62 may be applied to the filter 12, thereby applying a voltage across the filter 12 and the high voltage electrode(s) 62.

Such an air cleaner was prepared and the increase in the air-cleaning efficiency by applying electric voltage was examined. That is, the air cleaner had the basic structure of the embodiment shown in FIG. 10. As the filter, 0.4 m² of active carbon paper was used. The diameter of the disk 10 was 250 mm, the gap 30 between the disk 10 and the upper casing 20 was 7 mm, the difference between the inner diameter and the outer diameter of the filter 12 was 67 mm, and the number of turns of the wave of the filter was 60. The rotational speed of the disk 10 was 1000 rpm. A voltage of +8.76 kV was applied to the filter 12, and a voltage of −8.76 kV was applied to the high voltage electrode 62 at the air inlet. The discharge current was 110 $\mu$A. A chamber having a volume of 35.2 m was filled with smoke, and the rates of decrease in the concentration of the dusts were compared when the high voltage was applied and not applied.

The rate of decrease in the concentration of the dusts when the high voltage was applied was about 5 times that when the high voltage was not applied.

When using the above-mentioned air cleaner according to the present invention, the filter comes to be clogged with time and the air-cleaning efficiency decreases. In such a case, by replacing the filter with new one, the air-cleaning efficiency can be restored to the original state.

Alternatively, a structure with which the filter can be back washed may be employed. By back washing the filter to regenerate the filter, the air-cleaning efficiency may be restored to the original state. Further, by adjusting the amount of steam and the rotational speed of the disk, sterilization of the filter may also be attained, so that the apparatus can be kept clean. Further, in cases where the filter 12 contains active carbon, the active carbon is also regenerated so that its deodorizing ability is restored. The back wash may preferably be carried out by blowing steam to the filter from the outside thereof. Thus, an air cleaner with which the filter can be back washed has means for blowing steam to the filter from the outside thereof. Such an air cleaner may preferably have a tank receiving the water generated by condensation of the steam, and a passage guiding the water to the tank. Further, since the back wash is preferably carried out at a rotational speed of the filter smaller than the rotational speed during the air-cleaning operation, the air cleaner preferably has means for decreasing the rotational speed of the filter to, for example, about 0.1 to 30 rpm.

Figure 15:
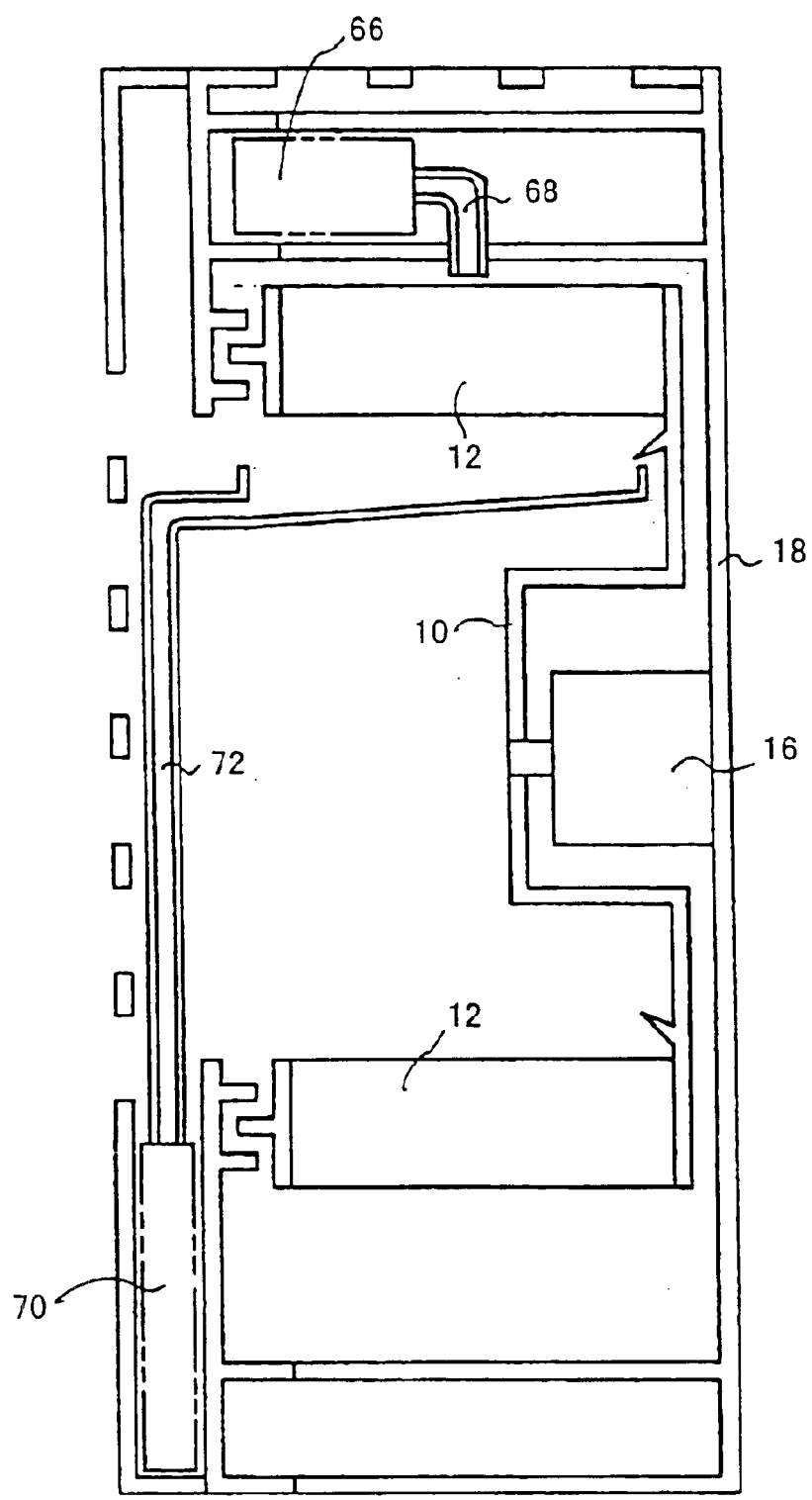
FIG. 15 is a schematic cross-sectional view of a preferred embodiment of the air cleaner according to the present invention, with which the filter can be back washed by blowing steam to the filter from the outside of the filter.

An embodiment with which the filter can be back washed is shown in FIG. 15. The air cleaner of the embodiment shown in FIG. 15 is operated while vertically holding the disk 10 at least when the filter is back washed. The embodiment shown in FIG. 15 has a steamer 66 and a steam duct 68 as means for blowing steam to the filter 12 from the outside of the filter 12. The embodiment further comprises a tank 70 for receiving the water generated by condensation of the steam and a passage 72 which guides the generated water to the tank 70.

It should be noted that the above-described air cleaner may be used not only as it is, but also as a part of a vacuum cleaner or the like by being arranged, for example, at the air outlet of the vacuum cleaner or the like.

In the foregoing description, air cleaners were described. By making the filter 12 retain water, the above-described air cleaners function as humidifiers. Such a humidifier may easily be attained by continuously blowing water shower to the filter 12 from a water duct not shown. By using such a filter, since the air absorbs moisture when the air passes through the filter 12, cleaning of the air and humidification of the air can simultaneously be attained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner comprising:
a disk;
a filter formed on a peripheral portion of said disk, said filter being formed along the peripheral portion of said disk so as to surround an inside area of said disk, and said filter being bent into a wave-shape such that irregularities of the wave are formed in a generally radial direction of said disk;
means for rotating said disk;
means for blowing steam to said filter from an outside surface of said filter to the inside area of the disk;
a tank, said tank receiving water generated by condensation of said steam; and
a passage, said passage guiding said water to said tank.

2. An air-humidifier which is the air cleaner according to claim 1, wherein said filter retains water.

3. The air cleaner according to claim 1, further comprising a casing enclosing said disk and said filter, said casing having at least one air inlet through which air to be cleaned is inhaled into the space surrounded by said filter, said casing having at least one air outlet formed on the portion of said casing that surrounds said filter, air discharged through said filter being discharged to the outside of said casing through said at least one air outlet.

4. The air cleaner according to claim 3, further comprising means for reducing airflow through a gap between an edge of said filter opposite to said disk and said casing, said means for reducing air flow being formed on said edge of said filter, and said edge is opposite to said disk.

5. The air cleaner according to claim 4, wherein said means for reducing air flow is an annular sealing plate which covers the entire said edge, said annular sealing plate is formed on said edge of said filter.

6. The air cleaner according to claim 5, wherein at least one annular ridge protruding to the direction opposite to said filter is formed on said sealing plate, and at least one annular ridge protruding to the direction of said sealing plate is formed on the region of said casing, and said region faces said sealing plate.

7. The air cleaner according to claim 6, wherein a plurality of said ridges are formed on at least one of said region of said casing facing said sealing plate and said sealing plate, and a tip portion of an opposing ridge is inserted into the space between adjacent two ridges of said plurality of ridges.

8. The air cleaner according to claim 4, wherein said means for reducing air flow is an annular elastic member which closes said gap, said elastic member being formed on said edge of said filter or on said casing.

9. The air cleaner according to claim 5, wherein said means for reducing air flow is an annular elastic member which closes said gap, said elastic member being formed on said edge of said filter or on said sealing plate, or on said casing.

10. The air cleaner according to claim 1, further comprising means for decreasing a rotational speed of said filter.

11. An air cleaner comprising:
a disk, said disk being rotatable;
a filter formed on a peripheral portion of said disk, said filter being formed along the peripheral portion of said disk so as to surround an inside area of said disk, and said filter being bent into a wave-shape such that irregularities of the wave are formed in a generally radial direction of said disk;
a steamer, said steamer blowing steam to said filter from an outside of said filter to the inside area of the disk;
a tank, said tank receiving water generated by condensation of said steam; and
a passage, said passage guiding said water to said tank.

12. An air-humidifier which is the air cleaner according to claim 11, wherein said filter retains water.

13. The air cleaner according to claim 11, further comprising a casing enclosing said disk and said filter, said casing having at least one air inlet through which air to be cleaned is inhaled into the space surrounded by said filter, said casing having at least one air outlet formed on the portion of said casing that surrounds said filter, air discharged through said filter being discharged to the outside of said casing through said at least one air outlet.

14. The air cleaner according to claim 13, further comprising means for reducing air flow through a gap between an edge of said filter opposite to said disk and said casing, said means for reducing air flow being formed on said edge of said filter, and said edge is opposite to said disk.

15. The air cleaner according to claim 14, wherein said means for reducing air flow is an annular sealing plate which covers the entire said edge, said annular sealing plate is formed on said edge of said filter.

16. The air cleaner according to claim 15, wherein at least one annular ridge protruding to the direction opposite to said filter is formed on said sealing plate, and at least one annular ridge protruding to the direction of said sealing plate is formed on the region of said casing, and said region faces said sealing plate.

17. The air cleaner according to claim 16, wherein a plurality of said ridges are formed on at least one of said region of said casing facing said sealing plate and said sealing plate, and a tip portion of an opposing ridge is inserted into the space between adjacent two ridges of said plurality of ridges.

18. The air cleaner according to claim 14, wherein said means for reducing air flow is an annular elastic member which closes said gap, said elastic member being formed on said edge of said filter or on said casing.

19. The air cleaner according to claim 15, wherein said means for reducing air flow is an annular elastic member which closes said gap, said elastic member being formed on said edge of said filter or on said sealing plate, or on said casing.

20. The air cleaner according to claim 11, further comprising means for decreasing a rotational speed of said filter.

* * * * *